(12) United States Patent
Jung et al.

(10) Patent No.: US 7,724,629 B2
(45) Date of Patent: May 25, 2010

(54) INFORMATION STORAGE MEDIUM AND METHOD OF RECORDING/REPRODUCING THE SAME

(75) Inventors: Kiu-hae Jung, Gyeonggi-do (KR); Jae-seong Shim, Seoul (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 751 days.

(21) Appl. No.: 10/673,402

(22) Filed: Sep. 30, 2003

(65) Prior Publication Data
US 2004/0109400 A1 Jun. 10, 2004

(30) Foreign Application Priority Data
Dec. 10, 2002 (KR) .................. 10-2002-0078167

(51) Int. Cl.
*G11B 7/00* (2006.01)
(52) U.S. Cl. .................. 369/59.25; 369/275.3
(58) Field of Classification Search .............. 369/59.25, 369/275.3; G11B 7/0045, 7/24, 7/45, 7/00
See application file for complete search history.

(56) References Cited

U.S. PATENT DOCUMENTS

| | | | |
|---|---|---|---|
| 4,142,209 A * | 2/1979 | Hedlund et al. ............... 386/95 |
| 4,229,808 A | 10/1980 | Hui |
| 5,132,954 A * | 7/1992 | Kulakowski et al. ..... 369/47.12 |
| 5,365,382 A * | 11/1994 | Weng et al. .................... 360/51 |
| 5,502,699 A * | 3/1996 | Yamasaki et al. ......... 369/47.19 |
| 5,513,010 A * | 4/1996 | Kori et al. .................... 386/104 |
| 5,587,979 A * | 12/1996 | Bluthgen ................. 369/30.18 |
| 5,596,564 A | 1/1997 | Fukushima et al. |
| 5,715,356 A * | 2/1998 | Hirayama et al. ............. 386/96 |
| 5,737,287 A | 4/1998 | Lee |
| 5,793,724 A * | 8/1998 | Ichikawa et al. ......... 369/47.31 |
| 5,881,037 A * | 3/1999 | Tanaka et al. ............ 369/59.24 |
| 5,917,792 A * | 6/1999 | Shigenobu et al. ....... 369/59.26 |
| 5,987,066 A * | 11/1999 | Kojima et al. ............... 375/253 |
| 6,005,839 A * | 12/1999 | Sako et al. ............... 369/275.3 |

(Continued)

FOREIGN PATENT DOCUMENTS

EP 0899734 * 3/1999

(Continued)

OTHER PUBLICATIONS

EFMPlus: The Coding Format of the Multimedia Compact Disc Immink, IEEE transactions on Consumer Electronics, vol. 41, No. 3, Aug. 1995, pp. 491-497.*

(Continued)

*Primary Examiner*—Peter Vincent Agustin
(74) *Attorney, Agent, or Firm*—NSIP Law

(57) ABSTRACT

An information storage medium has user data areas and additional data areas, and sync patterns to distinguish the additional data areas from the user data areas. The information storage medium includes a user data area in which user data is recorded and an additional data area located in at least one of areas before and after the user data area. Second sync patterns used in the additional data area are different from first sync patterns used in the user data area.

15 Claims, 6 Drawing Sheets

U.S. PATENT DOCUMENTS

| | | | |
|---|---|---|---|
| 6,108,152 | A | 8/2000 | Du et al. |
| 6,125,156 | A * | 9/2000 | Watanabe ................ 375/368 |
| 6,174,170 | B1 * | 1/2001 | Olmedo ................ 434/307 A |
| 6,188,335 | B1 * | 2/2001 | Roth et al. ................ 341/59 |
| 6,191,903 | B1 * | 2/2001 | Fujimoto et al. ............ 360/48 |
| 6,236,631 | B1 | 5/2001 | Deguchi et al. |
| 6,249,896 | B1 | 6/2001 | Ho et al. |
| 6,320,840 | B1 | 11/2001 | Oh et al. |
| 6,339,627 | B1 | 1/2002 | Ashizawa |
| 6,470,142 | B1 * | 10/2002 | Isozaki et al. ............. 386/124 |
| 6,581,167 | B1 | 6/2003 | Gotoh et al. |
| 6,600,431 | B1 | 7/2003 | Shim et al. |
| 6,600,713 | B1 | 7/2003 | Tognazzini |
| 6,704,262 | B2 | 3/2004 | Shishido et al. |
| 6,788,753 | B1 | 9/2004 | Brown |
| 6,791,777 | B2 * | 9/2004 | Watanabe et al. ............ 360/51 |
| 6,816,447 | B1 | 11/2004 | Lee et al. |
| 6,950,603 | B1 * | 9/2005 | Isozaki et al. ............... 386/95 |
| 6,996,048 | B2 | 2/2006 | Senshu |
| 7,006,760 | B1 | 2/2006 | Takagi et al. |
| 7,065,030 | B2 | 6/2006 | Tachino et al. |
| 7,120,105 | B2 | 10/2006 | Okamura et al. |
| 7,254,316 | B2 * | 8/2007 | Koshino et al. ............. 386/96 |
| 7,266,753 | B2 | 9/2007 | Tomita |
| 2001/0010604 | A1 * | 8/2001 | Esumi ........................ 360/49 |
| 2003/0103429 | A1 * | 6/2003 | Senshu ................... 369/47.24 |
| 2003/0174625 | A1 * | 9/2003 | Okamura et al. ........ 369/59.25 |
| 2003/0179689 | A1 * | 9/2003 | Yoon et al. ............... 369/275.3 |
| 2004/0168010 | A1 * | 8/2004 | Kim et al. ..................... 711/4 |

FOREIGN PATENT DOCUMENTS

| | | | |
|---|---|---|---|
| JP | 04-113563 | * | 4/1992 |
| JP | 9-162857 | | 6/1997 |
| JP | 11-176081 | | 7/1999 |
| JP | 2002-260341 | | 9/2002 |
| JP | 2002-304821 | | 10/2002 |
| JP | 2004-103096 | | 4/2004 |
| WO | 02/052551 | | 7/2002 |
| WO | WO 02/052551 | | 7/2002 |

OTHER PUBLICATIONS

Supplementary European Search Report issued on Apr. 18, 2008, in European Patent Application No. 03774370.5 (in English).
Supplementary European Search Report issued on Apr. 18, 2008, in European Patent Application No. 03774370.5 (in English).
Japanese Office Action issued on Jul. 14, 2009, in Japanese Patent Application No. 2004-558515 (6 pages, in Japanese with complete English translation).

* cited by examiner

FIG. 5

| Type of sync pattern | | Sync No. | 18-bit sync body does not satisfy RLL (1,7) | 8-bit sync ID satisfies RLL (1,7) | Remark |
|---|---|---|---|---|---|
| First sync patterns | | 0 | 001 001 010 000 000 010 | 000 001 | User data area sync data |
| | | 1 | 001 001 010 000 000 010 | 010 010 | |
| | | 2 | 001 001 010 000 000 010 | 101 000 | |
| | | 3 | 001 001 010 000 000 010 | 100 001 | |
| | | 4 | 001 001 010 000 000 010 | 000 100 | |
| | | 5 | 001 001 010 000 000 010 | 001 001 | |
| | | 6 | 001 001 010 000 000 010 | 010 101 | |
| | | 7 | 001 001 010 000 000 010 | 010 000 | |
| | | 8 | 001 001 010 000 000 010 | 101 010 | |
| Second sync patterns | Third sync pattern | 9 | 001 001 010 000 000 010 | 100 101 | Additional data area sync data |
| | Fourth sync pattern | 10 | 001 001 010 000 000 010 | 101 001 | |

FIG. 6

| Type of Sync Pattern | | Sync No. | 22-bit Sync Body Does Not Satisfy RLL (2,10) | 10-bit Sync ID Satisfies RLL (2,10) | Remark |
|---|---|---|---|---|---|
| First Sync Patterns | | 0 | 100 001 000 000 000 000 000 010 0 | 010 001 000 1 | User Data Area Sync Data |
| | | 1 | 100 001 000 000 000 000 000 010 0 | 000 100 100 1 | |
| | | 2 | 100 001 000 000 000 000 000 010 0 | 010 000 010 0 | |
| | | 3 | 100 001 000 000 000 000 000 010 0 | 001 000 000 0 | |
| | | 4 | 100 001 000 000 000 000 000 010 0 | 100 100 100 0 | |
| | | 5 | 100 001 000 000 000 000 000 010 0 | 010 100 000 0 | |
| | | 6 | 100 001 000 000 000 000 000 010 0 | 000 010 000 0 | |
| Second Sync Patterns | Third Sync Pattern | 7 | 100 001 000 000 000 000 000 010 0 | 001 001 000 1 | Additional Data Area Sync Data |
| | Fourth Sync Pattern | 8 | 100 001 000 000 000 000 000 010 0 | 010 010 010 0 | |

INFORMATION STORAGE MEDIUM AND METHOD OF RECORDING/REPRODUCING THE SAME

CROSS-REFERENCE TO RELATED APPLICATION

This application claims the benefit of Korean Patent Application No. 2002-78167 filed on Dec. 10, 2002, in the Korean Intellectual Property Office, the disclosure of which is incorporated herein by reference in its entirety.

BACKGROUND OF THE INVENTION

1. Field of the Invention

The present invention relates to an information storage medium having user data areas and additional data areas and a method of reproducing information recorded on the information storage medium, and more particularly, to an information storage medium having an improved structure in which user data areas are distinguished from additional data areas and a method of recording information thereon and/or reproducing information from the information storage medium.

2. Description of the Related Art

Optical discs are generally used as information storage media of optical pickup devices which record information on and/or reproduce information from the optical discs without contacting the optical discs. Optical discs are classified as either compact discs (CDs) or digital versatile discs (DVDs) according to their information recording capacity. Optical discs can also be classified as either recordable discs or read-only discs according to their recording potential. Here, the recordable discs include 650 MB CD-Rs, CD-RWs, 4.7 GB DVD+R/RWs, DVD-random access memories (DVD-RAMs), DVD-R/RWs, and so forth. The read-only discs include 650 MB CDs, 4.7 GB DVD-ROMs, and the like.

FIG. 1 illustrates the data structure of a recordable information storage medium such as a CD-R or a CD-RW. Referring to FIG. 1, the recordable information storage medium includes user data areas A and additional data areas B located before and after the user data areas A. Here, the user data areas A are physical clusters in which data is recorded. The additional data areas B are divided into run-in areas and run-out areas.

The additional data areas B serve as spare areas in which data can be recorded even when a recording position of the information storage medium is changed with a variation in the speed of a spindle motor during rotating of the information storage medium on a turntable.

In a case where a read-only information storage medium is manufactured according to the above-described format, the read-only information storage medium is required to have the same structure as the recordable information storage medium so as to have reproduction compatibility in a drive and a format consistent with the recordable information storage medium. In other words, the read-only information storage medium has a structure including user data areas A and additional data areas B. Here, the additional data areas B are located before and after the user data areas A and must have the same length as the run-in areas and the run-out areas described with reference to FIG. 1. In this case, the additional data areas B have to be separated from the user data areas A.

SUMMARY OF THE INVENTION

Additional aspects and advantages of the invention will be set forth in part in the description which follows and, in part, will be obvious from the description, or may be learned by practice of the invention.

The present invention provides an information storage medium having user data areas and additional data areas, and sync patterns to distinguish the additional data areas from the user data areas, and a method of recording information on and/or reproducing information from the same.

According to an aspect of the present invention, an information storage medium includes a user data area in which user data is recorded and an additional data area located in at least one of areas before and after the user data area, where second sync patterns used in the additional data area are different from first sync patterns used in the user data area.

According to another aspect of the present invention, a method of recording information on and/or reproducing information from an information storage medium includes preparing user data area in which user data is recorded and an additional data area located in at least one of areas before and after the user data area, where second sync patterns used in the additional data area are formed differently from first sync patterns used in the user data area.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 5 is a table showing sync patterns according to an aspect of the invention; and FIG. 6 is a table showing sync patterns according to an aspect of the invention.

DETAILED DESCRIPTION OF THE EMBODIMENTS

Figure 1:
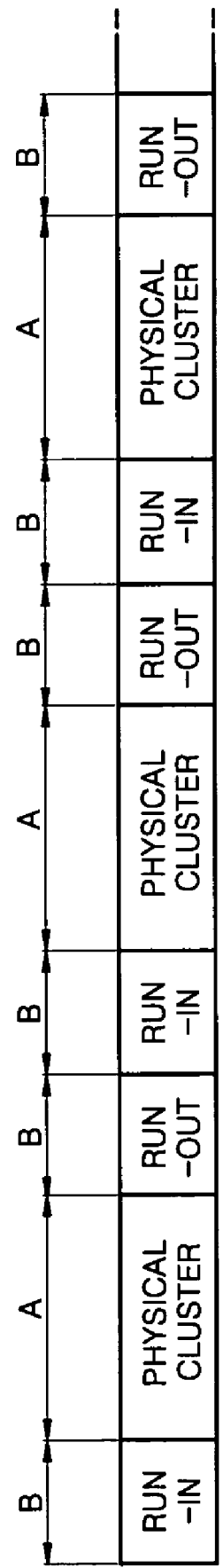
FIG. 1 illustrates the data structure of a conventional recordable information storage medium such as a CD-R or a CD-RW.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
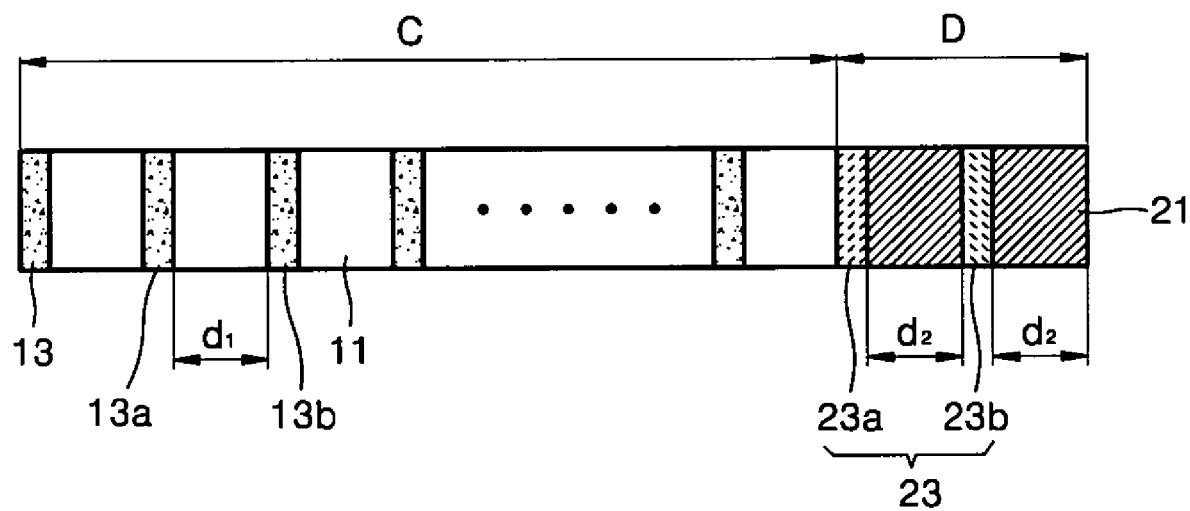
FIG. 2 illustrates the data structure of a recording unit of an information storage medium according to an embodiment of the present invention.
Figure 3:
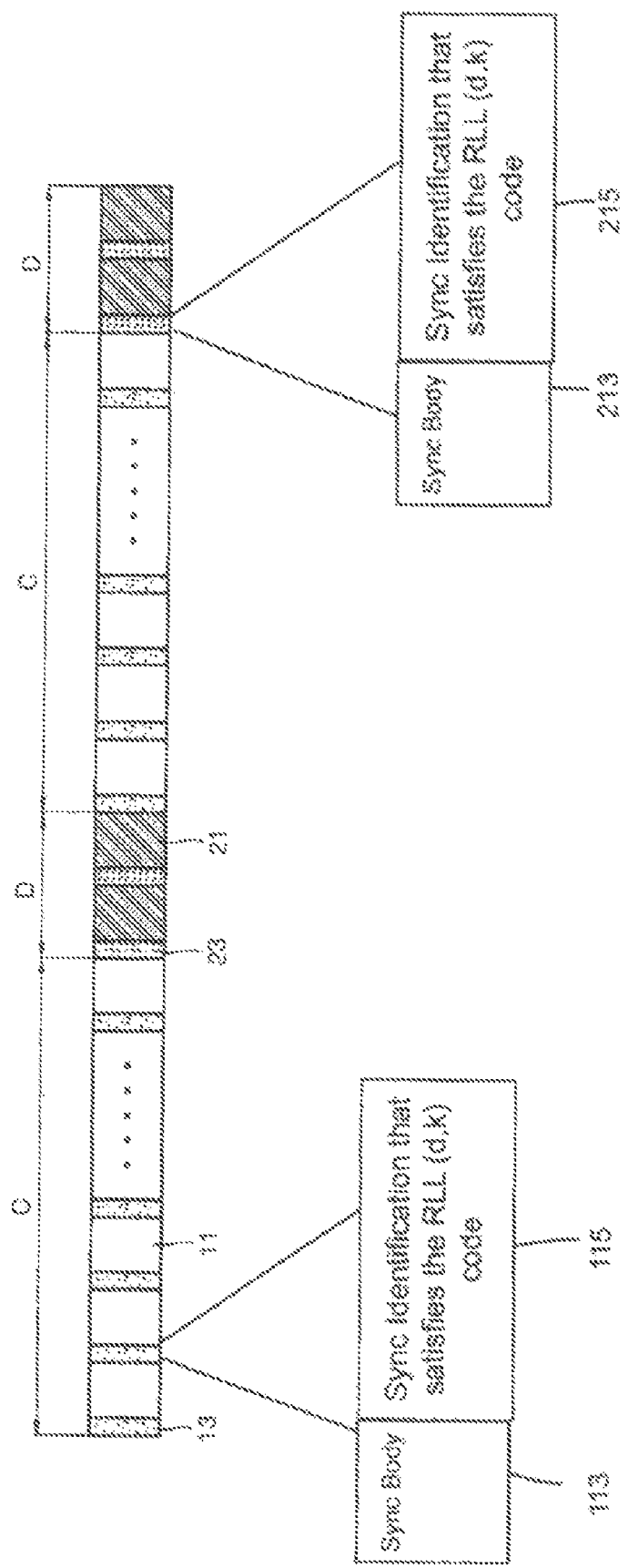
FIG. 3 illustrates the data structure of the information storage medium.

Referring to FIGS. 2 and 3, an information storage medium according to an embodiment of the present invention includes user data areas C in which user data is recorded and additional data areas D located before and/or after the user data areas C. The information storage medium may be a recordable information storage medium or a read-only information storage medium.

Each of the user data areas C contains a plurality of user data 11 separated by a plurality of first sync patterns 13. According to an aspect of the invention, the user data areas C include error correcting code (ECC) recording units.

Each of the additional data areas D contains a plurality of additional data 21 separated by a plurality of second sync patterns 23. Here, as will be explained later, the first sync patterns 13 have modulation codes corresponding to sync numbers shown in Tables 1 and 2 and are formed by combining predetermined selected sync numbers. The second sync patterns 23 are formed of predetermined types of patterns denoted by reference numerals 23a and 23b according to the same method as the plurality of first sync patterns 13.

According to an aspect of the invention, the second sync patterns 23 are different from the first sync patterns 13. In other words, the second sync patterns 23 are formed of patterns which are not used as the first sync patterns 13. By forming the second sync patterns 23 to be different from the first sync patterns 13, a reproducing system such as that shown in FIG. 4 can manage the additional data areas D by being able to differentiate the additional data areas D, with certainty, from the user data areas C.

The number of second sync patterns 23 depends on the length of the additional data areas D. It is preferable, but not required, that the second sync patterns 23 are arranged at equal intervals in order to increase an effective additional data efficiency of the additional data areas D. In addition, sync data can be easily restored during reproducing.

While not required, according to an aspect of the invention, the size of each of the plurality of user data 11 in the user data areas C is equal to a size of each of the plurality of additional data 21 in the additional data areas D. This structure can be realized by adjusting the positions of the second sync patterns 23.

It is preferable, but not required, that the entire size of additional data 21 in the additional data areas D be integer multiples of the size $d_1$ of user data 11 recorded between two adjacent first sync patterns 13a and 13b. In other words, referring to FIG. 2, the size $d_2$ of additional data 21 recorded between two adjacent second sync patterns 23a and 23b is equal to the size $d_1$ of the user data 11 recorded between first sync patterns 13a, 13b, and the additional data 21 are recorded in two parts of each of the additional data areas D. Thus, the total size of the additional data 21 is an integer multiple of (i.e., is twice the size of) the size $d_1$ of the user data 11. As a result, since sync signals are detected at regular intervals in all areas during reproducing of data, it is advantageous to restore the sync signals.

The structure of the information storage medium using a run-length-limited (RLL) (d, k) code will be described below. The RLL code indicates how many bits of value "0" exist between two bits of value "1". Thus, the RLL (d, k) code represents that the minimum number d and the maximum number k of bits of value "0" between two bits of value "1", respectively.

In the structure using the RLL (d, k) code, the first sync patterns 13 generally Include sync bodies that do not satisfy the RLL (d, k) code and sync identifications (IDs) that satisfy the RLL (d, k) code. In other words, the sync bodies have a run length k+i, where i is an integer that is greater than or equal to "1". The sync IDs contain different patterns to distinguish N different sync patterns.

The second sync patterns 23 include sync bodies that do not satisfy the RLL (d, k) code and sync IDs that satisfy the RLL (d, k) code. The sync IDs contain different patterns to distinguish N different sync patterns.

FIG. 3 illustrates an embodiment of the data structure of an information storage medium including additional data areas D each having two additional data frames. Sync bodies and sync IDs of the information storage medium having the above data structure are shown in Tables 1 and 2 below.

As can be seen in Table 1, a RLL (1,7) code is used. Each sync body has 18 bits, and each sync ID has 6 bits. The user data area C includes 9 user data frames having corresponding sync data, and the additional data area D includes two additional data frames having corresponding sync data.

TABLE 1

| Sync No. | 18-Bit Sync Body | 6-Bit Sync ID | Remark |
|---|---|---|---|
| 0 | 001 001 010 000 000 010 | 000 001 | User Data Area |
| 1 | 001 001 010 000 000 010 | 010 010 | Sync Data |
| 2 | 001 001 010 000 000 010 | 101 000 | |
| 3 | 001 001 010 000 000 010 | 100 001 | |
| 4 | 001 001 010 000 000 010 | 000 100 | |
| 5 | 001 001 010 000 000 010 | 001 001 | |
| 6 | 001 001 010 000 000 010 | 010 101 | |
| 7 | 001 001 010 000 000 010 | 010 000 | |
| 8 | 001 001 010 000 000 010 | 101 010 | |
| 9 | 001 001 010 000 000 010 | 100 101 | Additional Data Area |
| 10 | 001 001 010 000 000 010 | 101 001 | Sync Data |

As can be seen in Table 2, a RLL (2,10) code is used. Each sync body has 22 bits, and each sync ID has 10 bits. The user data area C includes 7 user data frames having corresponding sync data, and the additional data area D includes 2 additional data frames having corresponding sync data.

TABLE 2

| Sync No. | 22-Bit Sync Body | 10-Bit Sync ID | Remark |
|---|---|---|---|
| 0 | 100 001 000 000 000 000 010 0 | 010 001 000 1 | User Data Area |
| 1 | 100 001 000 000 000 000 010 0 | 000 100 100 1 | Sync Data |
| 2 | 100 001 000 000 000 000 010 0 | 010 000 010 0 | |
| 3 | 100 001 000 000 000 000 010 0 | 001 000 000 0 | |
| 4 | 100 001 000 000 000 000 010 0 | 100 100 100 0 | |
| 5 | 100 001 000 000 000 000 010 0 | 010 000 100 0 | |
| 6 | 100 001 000 000 000 000 010 0 | 000 010 000 0 | |
| 7 | 100 001 000 000 000 000 010 0 | 001 001 000 1 | Additional |
| 8 | 100 001 000 000 000 000 010 0 | 010 010 010 0 | Data Area Sync Data |

As shown in Tables 1 and 2, the sync data in the additional data D area have different patterns as compared to the sync data in the user data area C. In other words, the sync IDs of the second sync patterns 23 have sync patterns not used as the first sync patterns 13. Therefore, the additional data areas D can be managed and can be distinctly differentiated from the user data areas C.

A method of recording information on and/or reproducing information from the information storage medium having the above-described structure will be described. As shown in FIG. 2, the user data areas C including basic ECC recording blocks and the additional data areas D located before and/or after the user data areas C are prepared in the information storage medium. Next, the second sync patterns 23 used in the additional data areas D are formed differently from the first sync patterns 13 used in the user data areas C.

Here, the second sync patterns 23 are plural and arranged at equal intervals. It is preferable, but not required, that the second sync patterns 23 are arranged in the additional data areas D so that the size of each of user data 11 in the user data areas C is equal to the size of each of additional data 21 in the additional data areas D.

Sync data in the additional data areas D contains sync bodies having second sync patterns that do not comply with the RLL (d, k) code and sync IDs having second sync patterns that comply with the RLL (d, k) code. The total size of additional data 21 in the additional data areas D is an integer multiple of the size of user data 11 recorded between two first sync patterns 13a and 13b.

FIG. 5 shows the sync patterns of the above Table 1 according to an aspect of the invention. The sync patterns for the user data area identified as Sync Nos. 0-8 may be considered to be first sync patterns, and the sync patterns for the additional data area identified as Sync Nos. 9 and 10 may be considered to be second sync patterns. The second sync patterns identified as Sync Nos. 9 and 10 may be considered to include a third sync pattern identified as Sync No. 9, and a fourth sync pattern identified as Sync No. 10. Each of the sync patterns includes an 18-bit sync body that does not satisfy the RLL (1, 7) code, and a 6-bit sync ID that satisfies the RLL (1, 7 code).

FIG. 6 shows the sync patterns of the above Table 2 according to an aspect of the invention. The sync patterns for the user data area identified as Sync Nos. 0-6 may be considered to be first sync patterns, and the sync patterns for the additional data area identified as Sync Nos. 7 and 8 may be considered to be second sync patterns. The second sync patterns identified as Sync Nos. 7 and 8 may be considered to include a third sync pattern identified as Sync No. 7, and a fourth sync pattern identified as Sync No. 8. Each of the sync patterns includes a 22-bit sync body that does not satisfy the RLL (2, 10) code, and a 10-bit sync ID that satisfies the RLL (2, 10 code).

As described above, an information storage medium and a method of recording information thereon and/or reproducing information therefrom according to the present invention can maintain consistency with the formats of different types of recordable information storage media and have reproduction compatibility in a drive.

Also, since sync patterns used in user data areas can be formed differently from sync patterns used in additional data areas, the additional data areas can be further efficiently separated from the user data areas.

Furthermore, by uniformly maintaining the length of data recorded in the user data areas and the additional data areas, sync signals can be detected at regular intervals in all areas during reproducing of data. Thus, it is advantageous to restore the sync signals.

While not specifically so limited, it is understood that the information storage medium can include the CD-Rs, CD-RWs, DVD-RWs, DVD-RAMs, DVD+RWs, as well as next generation high definition DVDs, such as Blu-ray discs, Advanced Optical Discs (AODs) and other optical storage media not listed above and/or to be developed.

Figure 4:
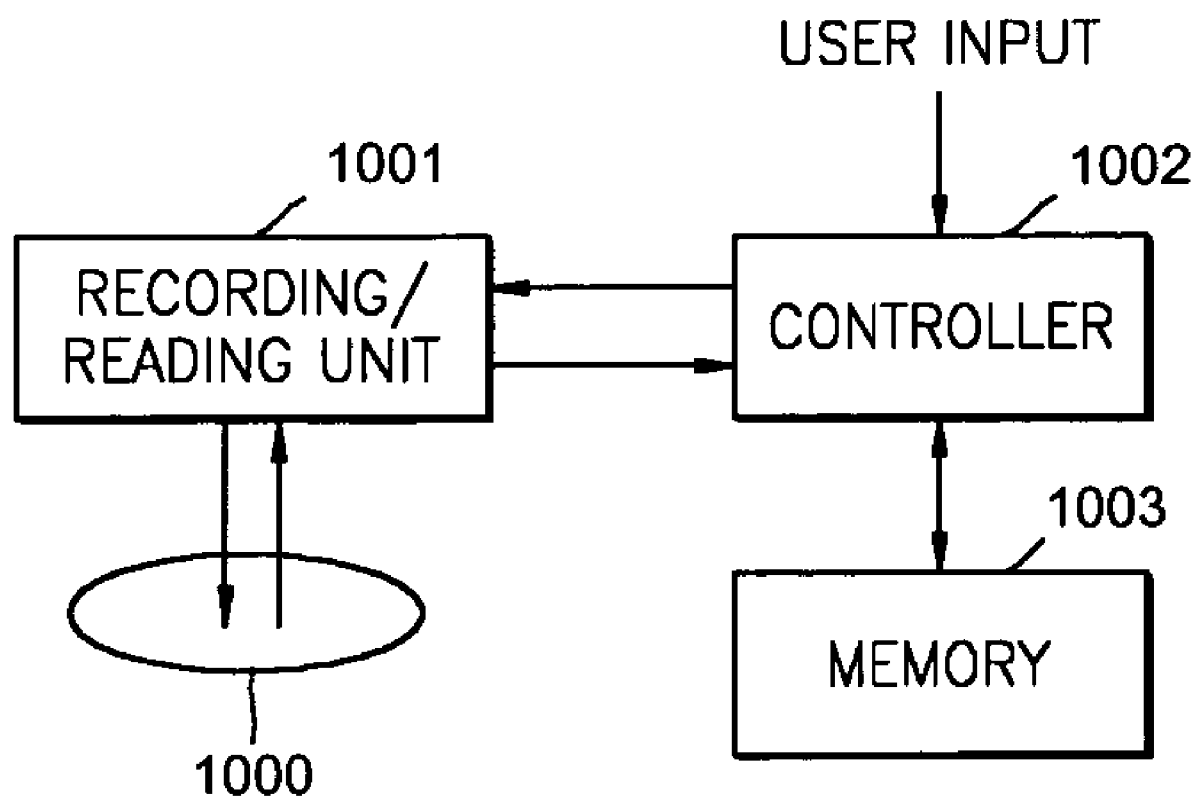
FIG. 4 is a block diagram of a recording and/or reproducing apparatus according to an embodiment of the present invention.

FIG. 4 is a block diagram of a recording and/or reproducing apparatus according to an embodiment of the present invention. Referring to FIG. 4, the recording and/or reproducing apparatus includes a recording/reading unit 1001, a controller 1002, and a memory 1003. The recording/reading unit 1001 records data on a disc 1000, which is an embodiment of an information storage medium of the present invention, and reads the data from the disc 1000. The controller 1002 records and reproduces the user data 11 and the additional data 21 according to the present invention as set forth above in relation to FIGS. 2 and 3.

While not required in all aspects, it is understood that the controller 1002 can be a computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AODs).

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. An information storage medium for use with a recording and/or reproducing apparatus, the information storage medium comprising:
   a user data area comprising a plurality of user data frames, each of the user data frames comprising corresponding sync data of a plurality of sync data; and
   an additional data area located before and/or after the user data area, and comprising at least two additional data frames, a first one of the additional data frames comprising first sync data, and a second one of the additional data frames comprising second sync data, the first sync data and the second sync data being different from the plurality of sync data of the user data frames, the first sync data and the second sync data enabling the apparatus to identify the additional data area from the user data area when the information storage medium is used with the apparatus;
   wherein:
     the first sync data comprises a first sync body and a first sync identification,
     the second sync data comprises a second sync body and a second sync identification,
     the first sync identification is different from the second sync identification,
     the information storage medium is a read-only information storage medium, and
     the additional data area makes the read-only information storage medium compatible with a recordable information storage medium.

2. The information storage medium of claim 1, wherein the plurality of sync data of the user data frames, the first sync data, and/or the second sync data are disposed in a plurality of locations, and are arranged so that adjacent ones of the plurality of sync data of the user data frames, the first sync data, and/or the second sync data are separated by equal intervals.

3. The information storage medium of claim 2, wherein the first sync data and/or the second sync data are arranged in a plurality of locations in the additional data area so that a size of each of the user data frames of the user data area separated by the plurality of sync data of the user data frames is equal to a size of each of the at least two additional data frames of the additional data area separated by the first sync data and/or the second sync data.

4. The information storage medium of claim 3, wherein:
   the plurality of sync data of the user data frames are arranged in a plurality of locations in the user data area, and
   a total size of the at least two additional data frames of the additional data area is an integer multiple of a size of each of the user data frames of the user data area separated by the plurality of sync data of the user data frames.

5. The information storage medium of claim 1, wherein the first sync data and/or the second sync data are arranged in a plurality of locations in the additional data area so that a size of each of the user data frames of the user data area separated by the plurality of sync data of the user data frames is equal to a size of each of the at least two additional data frames of the additional data area separated by the first sync data and/or the second sync data.

6. The information storage medium of claim 1, wherein the first sync data, the second sync data, and the plurality of sync data of the user data frames enable the apparatus to identify the additional data area from the user data area when the information storage medium is used with the apparatus without detecting any combination of any of the first sync data, the second sync data, and the plurality of sync data of the user data frames.

7. A recording and/or reproducing apparatus for use with an information storage medium, the information storage medium comprising a user data area comprising a plurality of user data frames, each of the user data frames comprising corresponding data of a plurality of sync data, the information storage medium further comprising an additional data area located before and/or after the user data area, the additional data area comprising at least two additional data frames, a first one of the additional data frames comprising first sync data, and a second one of the additional data frames comprising second sync data, the first sync data and the second sync data being different from the plurality of sync data of the user data frames, the first sync data and the second sync data enabling the apparatus to identify the additional data area from the user data area when the information storage medium is used with the apparatus, the apparatus comprising:
    a recording and/or reproducing unit to optically transfer user data and/or additional data between the apparatus and the information storage medium; and
    a controller to control the recording and/or reproducing unit to transfer the user data with respect to the user data area, and to transfer the additional data with respect to the additional data area;
    wherein:
        the first sync data comprises a first sync body and a first sync identification, and
        the second sync data comprises a second sync body and a second sync identification,
        the first sync identification is different from the second sync identification,
        the information storage medium is a read-only information storage medium, and
        the additional data area makes the read-only information storage medium compatible with a recordable information storage medium.

8. The recording and/or reproducing apparatus of claim 7, wherein the first sync data, the second sync data, and the plurality of sync data of the user data frames enable the apparatus to identify the additional data area from the user data area when the information storage medium is used with the apparatus without detecting any combination of any of the first sync data, the second sync data, and the plurality of sync data of the user data frames.

9. An information storage medium for use with a recording and/or reproducing apparatus, the information storage medium comprising:
    an additional data area comprising:
        a first additional data frame comprising first sync data; and
        a second additional data frame comprising second sync data; and a data area comprising a data frame comprising third sync data;
    wherein:
        the first sync data is different from the second sync data;
        the third sync data is different from the first sync data and the second sync data to enable the apparatus to identify the additional data area from the data area when the information storage medium is used with the apparatus;
        a size of the additional data area is an integer multiple of a size of the data frame;
        the additional data area provides compatibility among information storage media having different formats for use with the apparatus;
        the data area does not comprise any data frame comprising the first sync data; and
        the data area does not comprise any data frame comprising the second sync data.

10. The information storage medium of claim 9, wherein the first sync data, the second sync data, and the third sync data enable the apparatus to identify the additional data area from the data area when the information storage medium is used with the apparatus without detecting any combination of any of the first sync data, the second sync data, and the third sync data.

11. An information storage medium for use with a recording and/or reproducing apparatus, the information storage medium comprising:
    an additional data area comprising:
        a first additional data frame comprising first sync data; and
        a second additional data frame comprising second sync data; and
    a data area comprising a data frame comprising third sync data;
    wherein:
        the first sync data is different from the second sync data;
        the third sync data is different from the first sync data and the second sync data to enable the apparatus to identify the additional data area from the data area when the information storage medium is used with the apparatus;
        each of the first sync data and the second sync data comprises a sync identification and a sync body;
        the sync identification of the first sync data is different from the sync identification of the second sync data;
        the additional data area provides compatibility among information storage media having different formats for use with the apparatus;
        the data area does not comprise any data frame comprising the first sync data; and
        the data area does not comprise any data frame comprising the second sync data.

12. A reproducing apparatus for use with an information storage medium, the information storage medium comprising an additional data area comprising a first additional data frame comprising first sync data, and a second additional data frame comprising second sync data; the information storage medium further comprising a data area comprising a data frame comprising third sync data; wherein the first sync data is different from the second sync data; the third sync data is different from the first sync data and the second sync data to enable the apparatus to identify the additional data area from the data area when the information storage medium is used with the apparatus; a size of the additional data area is an integer multiple of a size of the data frame; the data area does not comprise any data frame comprising the first sync data; and the data area does not comprise any data frame comprising the second sync data; the apparatus comprising:

- a pickup to emit light onto the information storage medium; and
- a controller to control the pickup to reproduce data recorded in the data area;
- wherein the additional data area provides compatibility among information storage media having different formats for use with the apparatus.

13. A reproducing apparatus for use with an information storage medium, the information storage medium comprising an additional data area comprising a first additional data frame comprising first sync data, and a second additional data frame comprising second sync data; the information storage medium further comprising a data area comprising a plurality of data frames, each of the data frames comprising corresponding sync data of a plurality of sync data; wherein the first sync data is different from the second sync data; the plurality of sync data of the data frames is different from the first sync data and the second sync data to enable the apparatus to identify the additional data area from the data area when the information storage medium is used with the apparatus; each of the first sync data and the second sync data comprises a sync identification and a sync body; and the sync identification of the first sync data is different from the sync identification of the second sync data; the apparatus comprising:

- a pickup to emit light onto the information storage medium; and
- a controller to control the pickup to reproduce data recorded in the data area;
- wherein the additional data area provides compatibility among information storage media having different formats for use with the apparatus.

14. A method of reproducing information from an information storage medium, the information storage medium comprising an additional data area comprising a first additional data frame comprising first sync data, and a second additional data frame comprising second sync data; the information storage medium further comprising a data area comprising a data frame comprising third sync data; wherein the first sync data is different from the second sync data; the third sync data is different from the first sync data and the second sync data to enable the additional data area to be identified from the data area; a size of the additional data area is an integer multiple of a size of the data frame; the data area does not comprise any data frame comprising the first sync data; and the data area does not comprise any data frame comprising the second sync data; the method comprising:

- reproducing the first sync data and/or the second sync data; and
- reproducing data recorded in the data area;
- wherein the additional data area provides compatibility among information storage media having different formats.

15. A method of reproducing information from an information storage medium, the information storage medium comprising an additional data area comprising a first additional data frame comprising first sync data, and a second additional data frame comprising second sync data; the information storage medium further comprising a data area comprising a plurality of data frames, each of the data frames comprising corresponding sync data of a plurality of sync data; wherein the first sync data is different from the second sync data to enable the additional data area to be identified from the data area; the plurality of sync data of the data frames is different from the first sync data and the second sync data; each of the first sync data and the second sync data comprises a sync identification and a sync body; and the sync identification of the first sync data is different from the sync identification of the second sync data; the method comprising:

- reproducing the first sync data and/or the second sync data; and
- reproducing data recorded in the data area;
- wherein the additional data area provides compatibility among information storage media having different formats.

* * * * *